(12) United States Patent
Davies

(10) Patent No.: US 7,058,384 B2
(45) Date of Patent: Jun. 6, 2006

(54) RADIO SYSTEM WITH UNIVERSAL COMMUNICATION INTERFACE

(75) Inventor: John Davies, Wigginton (GB)

(73) Assignee: Davies Industrial Communications Limited, York (GB)

( * ) Notice: Subject to any disclaimer, the term of this patent is extended or adjusted under 35 U.S.C. 154(b) by 452 days.

(21) Appl. No.: 10/149,857

(22) PCT Filed: Dec. 15, 2000

(86) PCT No.: PCT/GB00/04837

§ 371 (c)(1),
(2), (4) Date: Oct. 15, 2002

(87) PCT Pub. No.: WO01/45282

PCT Pub. Date: Jun. 21, 2001

(65) Prior Publication Data

US 2003/0114134 A1    Jun. 19, 2003

(30) Foreign Application Priority Data

Dec. 16, 1999  (GB) ................................. 9929634.5

(51) Int. Cl.
*H04B 1/08*    (2006.01)

(52) U.S. Cl. ...................... 455/352; 455/348; 455/349; 455/88; 439/638; 439/643

(58) Field of Classification Search ................ 455/345, 455/344, 346–352, 557, 561, 569.1, 569.2, 455/575.1, 88, 550.1, 90.3, 100, 103, 128, 455/424, 425, 418, 419, 420, 422.1, 426.1, 455/456.5, 11.1, 41.1, 41.2, 63.1, 69, 575.9, 455/295, 78, 92, 151.2, 152.1, 95, 99, 456.6, 455/517, 44.2; 379/44–443, 447; 340/533, 340/539.1, 825.69, 825.72; 359/237, 325; 439/620, 628, 668, 669, 76.1, 951, 81, 500, 439/372, 929, 59, 95, 341, 300, 272, 353, 439/350, 357, 638, 358, 376, 643; 370/310, 370/323, 463

See application file for complete search history.

(56) References Cited

U.S. PATENT DOCUMENTS

| | | | | |
|---|---|---|---|---|
| 4,606,073 A | * | 8/1986 | Moore | 455/90.1 |
| 4,792,986 A | * | 12/1988 | Garner et al. | 455/90.2 |
| 5,118,309 A | * | 6/1992 | Ford | 439/620 |
| 5,263,181 A | | 11/1993 | Reed | |
| 5,333,205 A | | 7/1994 | Bogut | |
| 5,701,355 A | | 12/1997 | Brannan | |
| 5,790,947 A | * | 8/1998 | Dieringer | 455/345 |
| 5,802,167 A | * | 9/1998 | Hong | 379/388.02 |
| 5,884,198 A | * | 3/1999 | Kese et al. | 455/575.6 |
| 5,940,007 A | * | 8/1999 | Brinkmeyer et al. | 340/825.69 |
| 6,311,052 B1 | * | 10/2001 | Lenz | 455/305 |
| 6,745,014 B1 | * | 6/2004 | Seibert et al. | 455/74.1 |

FOREIGN PATENT DOCUMENTS

| | | |
|---|---|---|
| FR | 2 693 962 | 1/1994 |
| GB | 2 287 231 A | 9/1995 |

* cited by examiner

*Primary Examiner*—Edward F. Urban
*Assistant Examiner*—Charles Chow
(74) *Attorney, Agent, or Firm*—Martin Fleit; Paul D. Bianco; Fleit Kain Gibbons Gutman Bongini & Bianco P.L.

(57) ABSTRACT

A radio system comprises a radio having a transmit mode activated by a press to talk (PTT) switch mounted on a universal communication interface for mounting on a radio interface associated with the radio. The radio interface may or may not form part of the radio and a plurality of radio interfaces may be provided for different applications, such that a standard universal communication interface can be used with different types of equipment.

21 Claims, 5 Drawing Sheets

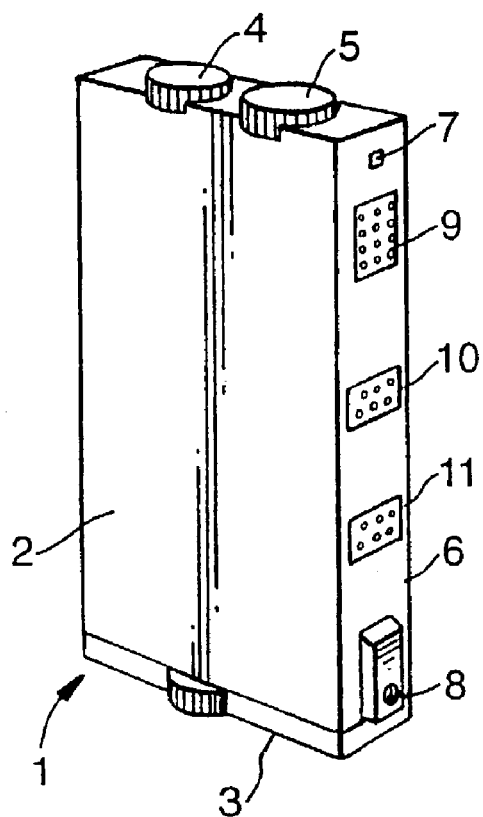
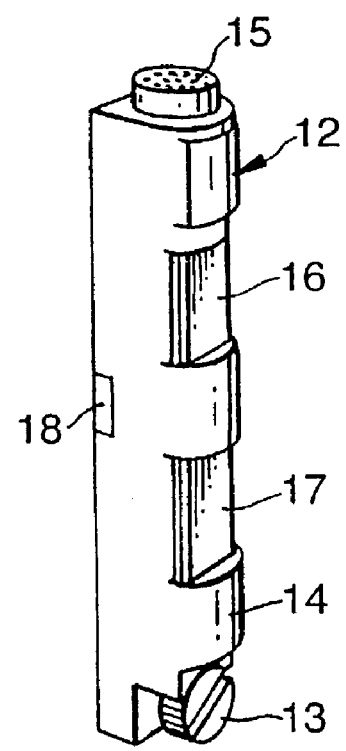
Fig.1A.
Fig.1B.

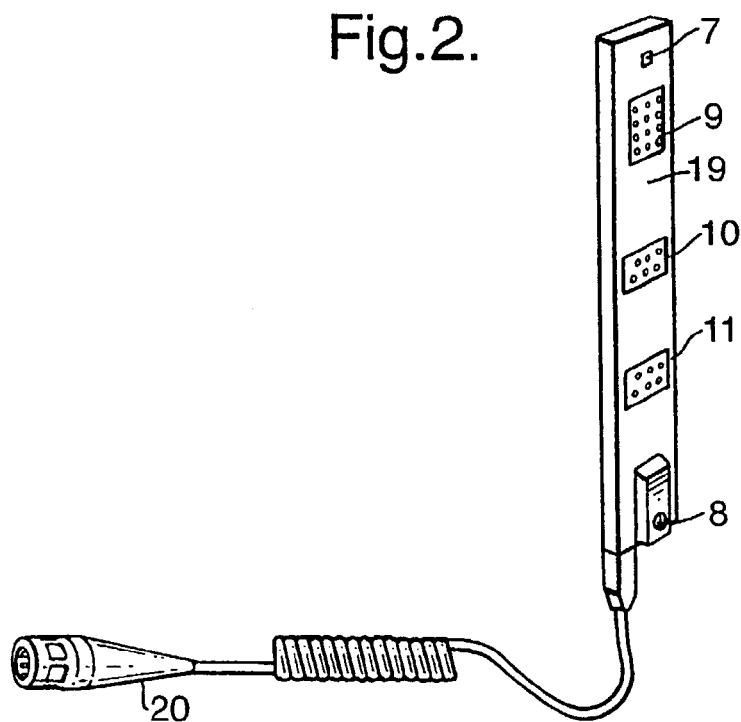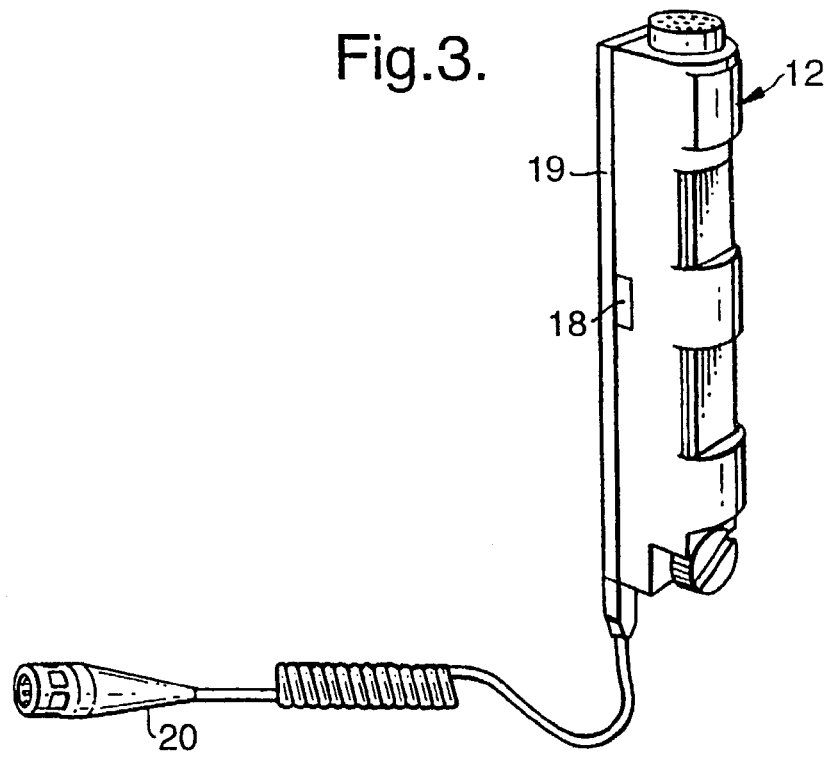

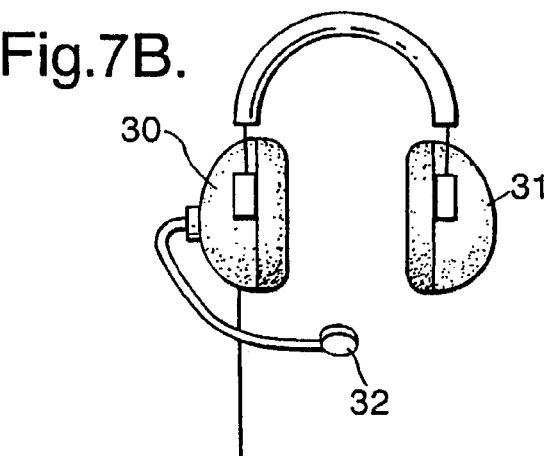
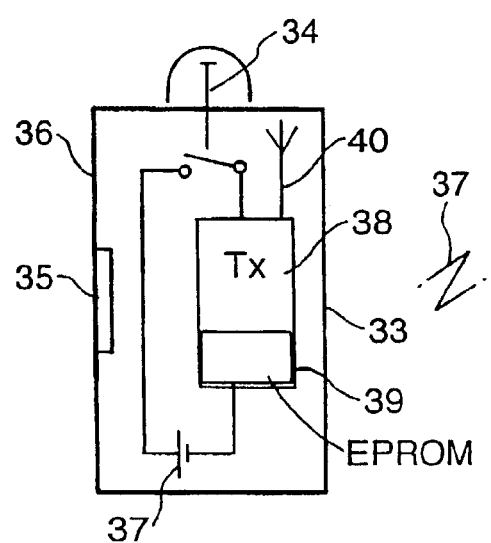
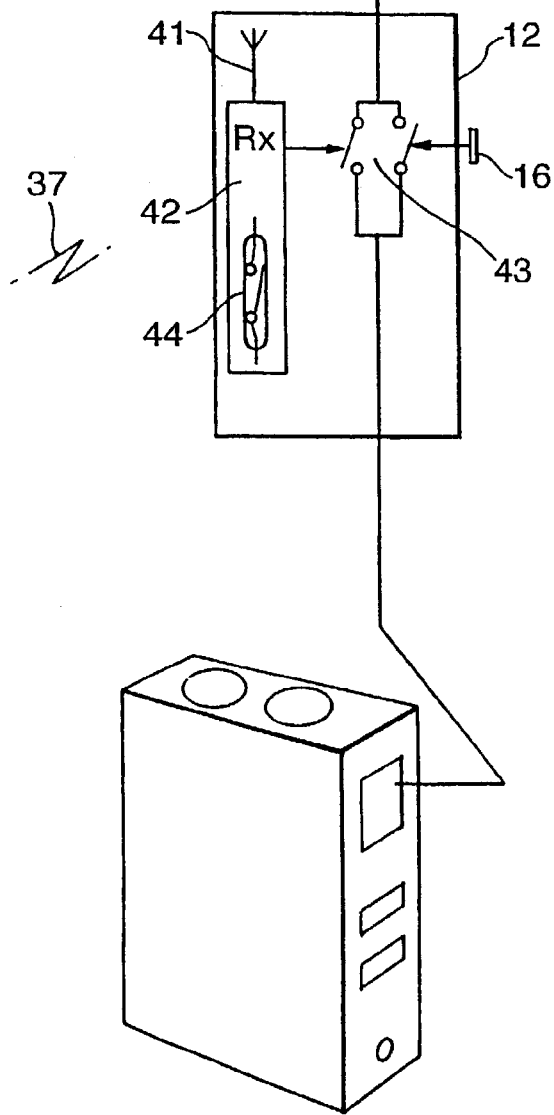

RADIO SYSTEM WITH UNIVERSAL COMMUNICATION INTERFACE

FIELD OF THE INVENTION

The present invention relates to a radio system and particularly, but not exclusively, to a system employing what are commonly known as a personal role radios as typically carried by members of the armed forces or organisations such as the police. Here there is often a requirement for an individual to have a personal role radio to permit two way communication.

BACKGROUND OF THE INVENTION

Conventional two way radios operate in either duplex or simplex mode, the duplex mode is similar to a telephone system where the receive and transmit paths are both open and both parties can speak to each other with no other requirement.

The more common operation is simplex where the transmit path of each radio only works when the transmitter is keyed by the operation of a "press to talk switch" (PTT). The types of switch used vary and can be either part of a microphone as in the case of the hand held types in common use, or a switch box in a lead between the radio and a headset, as used in commercial and operational headsets.

Operators often have to operate a radio transmit switch while using their hands to do other things and certain systems incorporate voice activation where the radio is switched at the detection of the users voice from the microphone. This technique is not reliable with some applications and the need for a switch actuated by the user is still the only reliable means of controlling the radio.

SUMMARY OF THE INVENTION

According to the present invention there is provided a radio system including a radio and a press to talk (PTT) switch which when operated, sets the radio to a transmit mode, characterised in that the switch forms part of a switch unit which is supported on the radio by an interface arrangement allowing detachment of the switch unit from the radio.

By employing the present invention it is possible to interchange switch units and radios. This is particularly advantageous in applications, for example with the Police or Military, where it enables one single switch unit type to be common to a number of applications. This simplifies provision of spares, the number of lead termination types required on auxiliary equipment, such as headsets, and the amount of training required for operators, for regardless of what radio they may be using as the control principles are the same. More importantly once an operative has become familiar with the use of one switch unit which can be fitted to any radio, there is less likelihood of incorrect PTT switch operation caused by being unfamiliar with an equipment type as may occur whilst the operative is concentrating on objectives other than operation of the radio.

Preferably the system comprises a variety of radio types which can each receive a standard switch unit. Particular mountings maybe required for certain types of vehicle or for where a radio is to be worn by the operator.

The switch unit will normally be mounted directly on the housing of the radio, which is particularly advantageous where the radio is a personal role radio carried, normally by being strapped, to an operative. Here the radio and switch unit may form one complete unit with no need for any auxiliary wiring between the two. A headset and lapel microphone or similar may be connected to the switch unit in the normal manner.

An optional additional facility is the provision of a remote interface located away from the radio but connected thereto by a physical communication link, either a wire or optical fibre. This may be of particular advantage if the radio is for example a large radio mounted in a vehicle for this enables the radio to be mounted at any location within the vehicle. The operative may then have the switch unit mounted on its remote radio interface at a location convenient to the operative, or the radio interface may even be worn by the operative.

In certain applications, particularly military applications, there is a requirement for a personal role radio to communicate locally by two way radio, but the operative may also need to be connected to a different radio network, for example a combat network radio. In this scenario the switch unit is particularly advantageous if arranged to be connected to a personal role radio by means of the radio interface and to be connected to a second radio by means of a wire or optical link. It is then particularly advantageous that the switch unit has two PTT switches mounted thereon, one associated with each radio network.

In some applications it is required that there is no possibility of cross-communication between different radio networks. The switch unit may thus contain circuitry to ensure no cross-communication can occur between at least one transmission and one reception signal associated with different radio networks by closing one channel (normally a transmit channel when a receive channel is in use).

The system of the invention may additionally comprise a wired remote PTT module having a PTT switch, which module is small relative to the switch unit, the switch unit having a connection for the wire to the remote PTT switch. This enables the function of the PTT switch of the switch unit to be operated remotely of the switch unit, enabling the remote PTT module and associated switch to be mounted at a location convenient to the operative, for example on the handlebars of a motorbike.

As an alternative to, or in addition to, the small wired remote PTT module the system may further comprise a cordless remote PTT module comprising a PTT switch, the remote module additionally comprising a short range, relative to the radio, cordless transmitter. The switch unit then additionally comprises a receiver for receiving signals from the remote module to remotely activate the function of the PTT switch of the switch unit. This is particularly advantageous for no matter whether the switch unit is mounted to a personal role radio or to a remote radio interface, possibly mounted to a vehicle, the operative has the means of performing the switching function remotely by means of the remote module. The short range transmission may be infrared but preferably is by way of a radio transmitter.

Preferably where the switch unit has two PTT switches associated with two different radio networks the remote module comprises two PTT switches associated with the two radio networks.

Advantageous the signal transmitted from the remote module comprises a code to which the receiver in the switch unit is responsive thereby avoiding inadvertent operation when a number of remote modules are operated by respective individuals in close proximity.

The receiver in the switch unit is advantageously responsive to a variety of codes associated with different remote modules. This may be particularly advantageous where the switch unit is associated with an operative who may operate several pieces of equipment each fitted with a remote module. The operative can thus operate any piece of equipment associated with a remote module and effectively activate the PTT switch of his switch unit via the remote module associated with a respective piece of equipment.

Advantageously the receiver has a 'learn' mode in which it can learn a code associated with a remote module. This is particularly advantageous if the operative loses a remote module, or a remote module is damaged, because the lost or damaged module can be replaced by a new module having a different pre-programmed code which can then be learnt by the receiver. It is preferable that the receiver learn the code of the module rather than the remote module learn any code associated with the receiver for in this way no receiver is required by the remote module as it only needs to transmit code.

Preferably the switch unit of the system comprises a magnetically operated switch and the remote module comprises a magnet, the magnet and magnetically operated switch being arranged such that the magnetically operated switch is caused to adopt a 'learn' mode position when the remote module, including said magnet, is held in an appropriate position relative to the magnetically sensitive switch, in which position activation of the PTT switch on the remote module causes the switch unit to learn the code transmitted by the remote module.

By pressing the PTT switch on the remote module a number of times or for period in excess of a predetermined period one or more codes can be removed from the UCI so that the receiver is no longer responsive to those codes. Typically such action would clear all the codes from the receiver which would then re-learn the desired code.

BRIEF DESCRIPTION OF THE DRAWINGS

One embodiment of the present invention will now be described by way of example only with reference to the accompanying figures of which:

FIG. 1A is a perspective view of a personal role radio forming one part of a radio system constructed in accordance with the present invention;

FIG. 1B is a perspective view of a switch unit or "universal communication interface" which fits onto the radio of FIG. 1A to form a system in accordance with the present invention;

FIG. 2 is a perspective view of a remote radio interface;

FIG. 3 shows the assembled apparatus of FIGS. 1B and 2;

FIG. 7A schematically illustrates the primary components within the remote module illustrating FIG. 6; and FIG. 7B illustrates the primary components of the universal communication interface of FIG. 1B and FIG. 6 which relate to remote operation of the universal communication interface by means of the remote module of FIG. 7A.

DETAILED DESCRIPTION OF THE INVENTION

Figure 4:
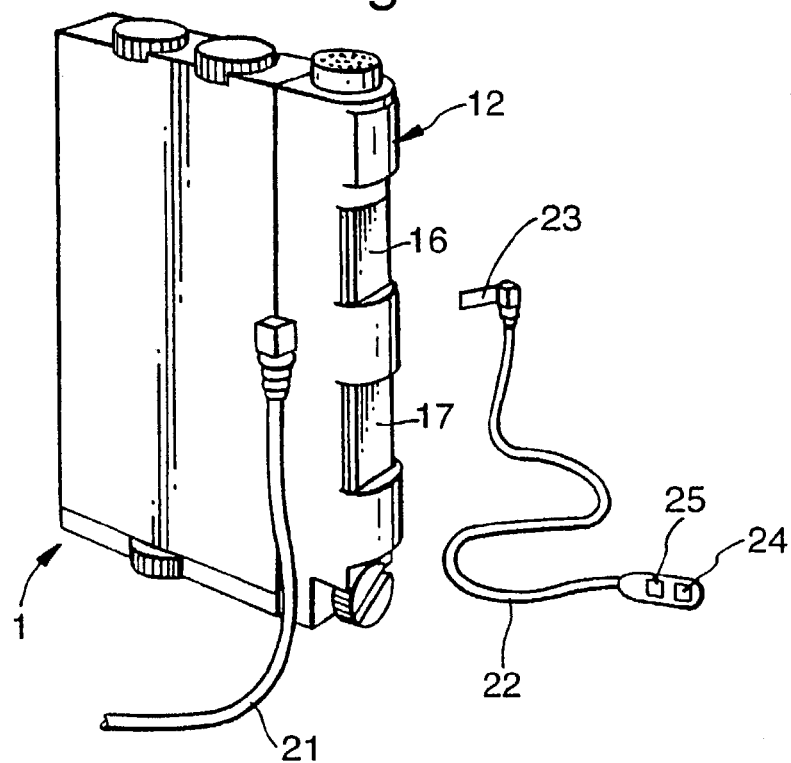
FIG. 4 shows the assembled apparatus of FIG. 1A and FIG. 1B with auxiliary components.

Referring now to FIG. 1, a personal role radio is illustrated generally as 1, having a casing 2, a battery compartment cover 3, operating controls 4 and 5, and an end face constituting a radio interface 6. The interface 6, has a fitting slot 7, fitting thread 8 and electrical interconnects 9, 10 and 11.

The personal role radio 1 comprises an aerial, (which is internal on the embodiment illustrated), a transmitter and receiver by which it may send and receive radio signals. The personal role radio is designed to be carried by an operative and would typically be carried on a belt or could be mounted in close proximity to the operative, for example on a vehicle associated with the operative.

The radio interface 6 is designed to receive the "universal communication interface" or "UCI" indicated generally as 12 in FIG. 1B. The UCI 12 comprises a stud not shown and screw 13 which co-operate respectively with fitting slot 7 and fitting thread 8 to hold the UCI housing 14 in position. The UCI 12 comprises a headset connector 15, push to talk (PTT) buttons 16 and 17 respectively associated with two different radio networks and two slots, only one 18 of which is shown, for receiving optional cable connections.

The switches 16 and 17 are depressed in order to talk to respective communication networks through respective radios, one button 16 is associated with the personal role radio 1 of FIG. 1A, while button 17 is associated with a external radio network, which may be a combat network radio where the radio system is employed in a military application.

The universal communication interface comprises circuitry to ensure that when a signal is being received on one communication network the press to talk function controlled by the button associated with the other network cannot be activated. This ensures that a radio signal being received and transmitted to a user, possibly by means of a headset, cannot inadvertently be picked up by the open microphone and simultaneously transmitted on the other radio network.

When the radio of FIG. 1A is mounted to the UCI of FIG. 1B and an appropriate headset or speaker/microphone are connected to the UCI there is formed a self-contained personal role radio which may be carried by an operative, the radio interfacing with the universal communication interface via contacts 9 and corresponding contacts (not shown) on the universal communication interface 12.

There are applications where it is not convenient for the operative to carry the personal role radio, or where the operative may wish to use another radio, perhaps mounted in a vehicle. Indeed the operative may wish to mount his personal role radio within a vehicle. This is facilitated by the remote radio interface 19 of FIG. 2 which is identical to the interface 6 on the personal role radio on FIG. 1A, but instead of being part of that personal role radio is now a stand alone interface which may be connected to another radio which could be mounted on board a vehicle, aircraft, boat etc, or a large man-pack infantry radio, by means of connection lead 20.

The remote radio interface 19 comprises the same physical and electrical connections as the interface 6 and thus the UCI can be mounted to the remote radio interface 19 as shown in FIG. 3. Referring now to both FIG. 1B and FIG. 3, slot 18 in the UCI 12 may receive a cable with contacts on a spade which connect to contacts 10. A corresponding slot (not shown) on the other side of the UCI permits a similar cable with, contacts to connect with the contacts 11 on the interface 6 or 19. These additional leads are illustrated in FIG. 4, lead 21 being connected and lead 22 shown disconnected in order to illustrate contact spade 23 which connects to contacts 11 of FIGS. 1A and 2.

In the arrangement shown in FIG. 4, the UCI 12 is mounted on the personal role radio 1 but could equally be connect to the remote radio interface 19 of FIG. 2, as shown in FIG. 3. Lead 21 may be connected to an auxiliary radio depending on the application, whilst leads 22 connects remote switches 24 and 25, corresponding to press to talk switches 16 and 17 to the UCI 12. The additional switches 24 and 25 may be located at a position convenient to an operative for example, on the handlebars of a motorcycle or quad bike or on the stock of a rifle. This permits the radio to be operated without the operative needing to remove his hands from the controls of the vehicle or from a gun he his carrying. Alternatively, depending on the application, this function may be satisfied simply by having the UCI 12 mounted on the remote radio interface 19 as shown in FIG. 3 and having the complete unit then mounted at an appropriate location, either on a vehicle or perhaps on a chest holster worn by an operative. It will be realised that there are any number of permutations which a remote universal communication interface 12 permits.

Figure 5:
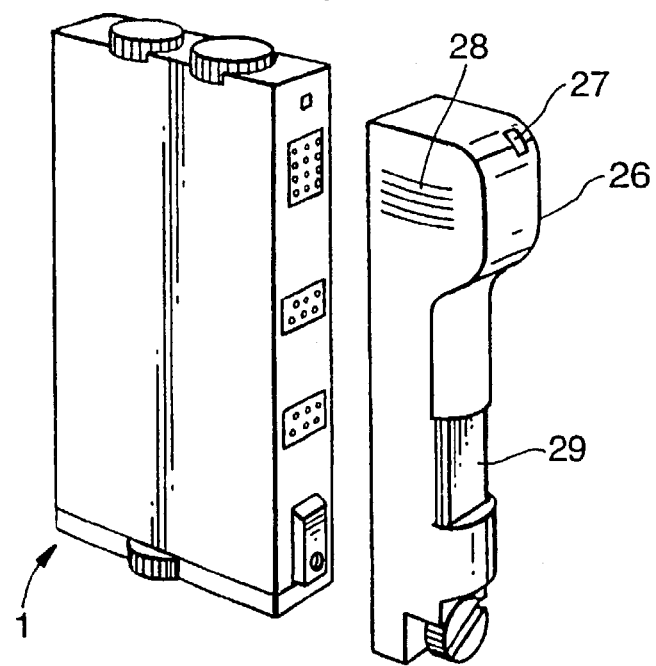
FIG. 5 illustrates an alternative universal communication interface with self-contained speaker and microphone.

Referring now to FIG. 5, there is illustrated a variation of the universal communication interface of FIG. 1B. Here UCI 26 incorporates a microphone 27 and speaker 28 such that it can be operated without a headset. In the embodiment illustrated there is only a single push to talk switch 29 but this is a matter of design choice. The UCI 26 interfaces with the personal role radio 1 of FIG. 1A, or the remote radio interface as illustrated in FIG. 2, in exactly the same manner as the UCI 12 illustrated in FIG. 1B.

Both UCI's 12 and 26, illustrated respectively in FIG. 1B and FIG. 5, incorporate a radio receiver, (which could equally be an infra-red receiver). The function of this receiver is described below with reference to FIG. 6 where, for illustrative purposes only, the UCI 12 of FIG. 1B is shown connected to a headset, illustrated generally as at 30 having headphones 31 and a microphone 32 located on a stalk which when worn by an operative is in front of the operatives mouth.

Figure 6:
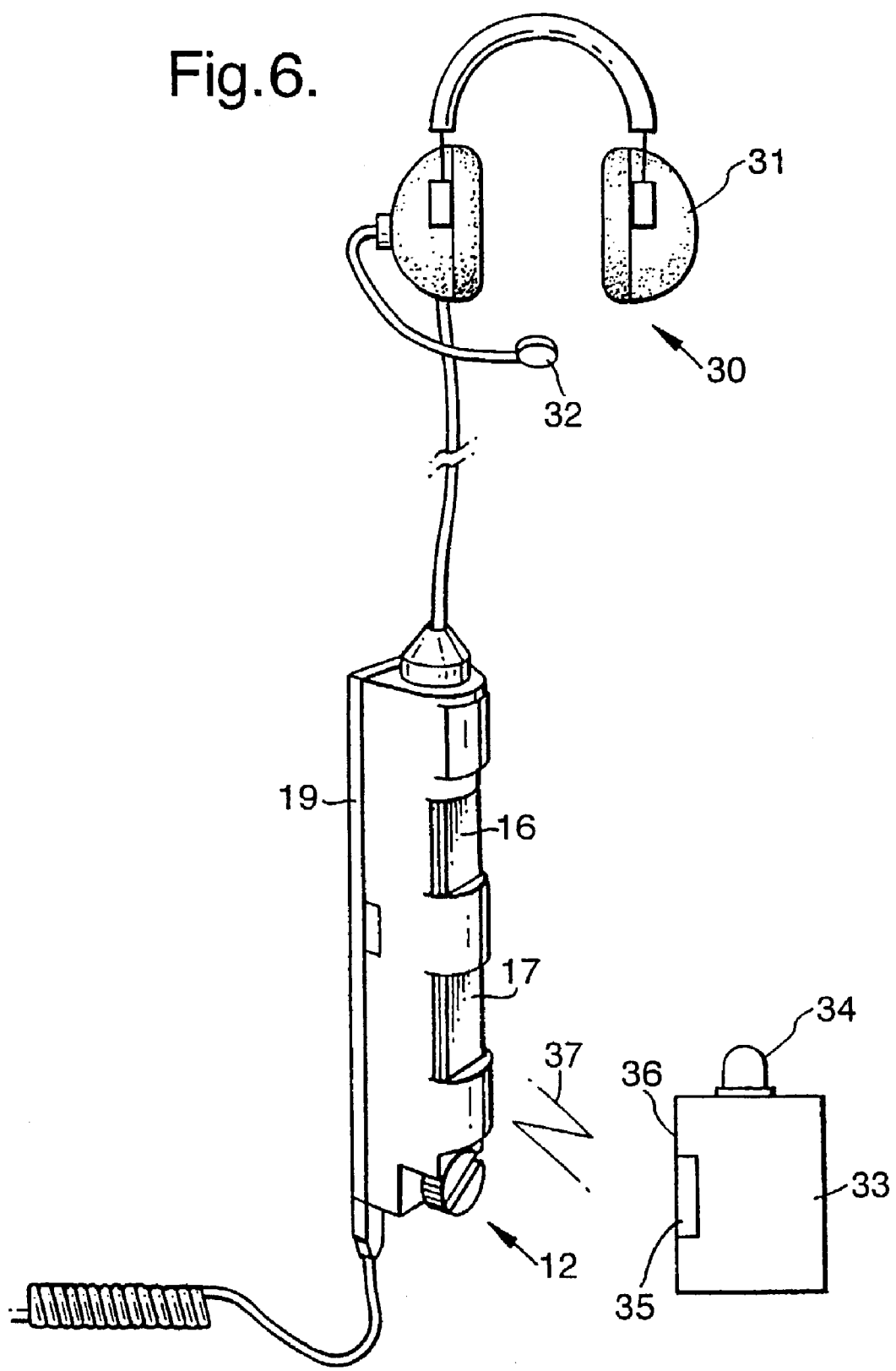
FIG. 6 illustrates the various communications equipment that interfaces with the universal communication interface of FIG. 1B.

In the embodiment illustrated in FIG. 6 the UCI 12 is mounted on the remote radio interface 19 previously described with reference to FIG. 2. The radio system additionally comprises a cordless remote press to talk (PTT) module 33 having a PTT switch 34 thereon and a magnet 35, located adjacent the wall of the casing 36 of the remote module 33. The remote module 33 comprises a low power transmitter arranged such that operation of the PTT switch 34 causes a signal 37 to be transmitted to the UCI 12 which when received by the receiver (not shown) of the UCI 12 the UCI functions as though the PTT switch (16) had been depressed.

The function of the remote module is described below in more detail with reference to FIGS. 7A and 7B, however it should be noted that although only one PTT switch 34 is illustrated on the remote module 33, in order to simplify the description, the module 33 could comprise two switches corresponding to the switches 16 and 17 of the UCI if the module is desired to be used with a UCI designed to operate with two networks.

Referring to FIG. 7A the remote module 33 is shown schematically to comprise a battery 37 connected by PTT switch 34 to transmit circuit 38. When the switch 34 is depressed the battery is connected to the transmit circuit which retrieves a code from EPROM 39. This code is effectively unique to the remote module and is transmitted in a signal via antenna 40 to receiving antenna 41 housed within the UCI 12 illustrated schematically in FIG. 7B, with the function of only one PTT switch 16 illustrated for clarity.

Referring to FIG. 7B the PTT switch 16 connects the microphone 32 to the personal role radio 1. (The communication path to the headphones 31 has been omitted for clarity). Although the headset is shown connected via UCI 12 to personal role radio 1 the radio could be any radio. The microphone 32 may be connected to the personal role radio 1 by means of switch 16 or by means of signal received by receiver 42 via antenna 41. The receiver 42 when receiving the correctly coded signal closes switch 43. It should be noted here that although FIG. 7, and description thereof, talks about opening and closing switches and the switches are illustrated as being physical switches contained within the UCI 12, in practice this function may be achieved electronically and indeed may be achieved by generating an appropriate signal to the transmitter contained within the radio 1.

In order that the receiver 42 may learn the code which the remote module 33 will transmit, the remote module 33 may be held adjacent the UCI 12 with magnet 35 adjacent a magnetically sensitive reed switch 44 in the receiver. With the magnet 35 adjacent the reed switch 44, the reed switch closes setting the receivers circuit to a 'learn' mode. An operative depressing the PTT switch 34 of the remote module 33 causes the code stored therein to be transmitted from the remote module 33 to the receiver 42, which code is then stored in memory in the receive circuit 42 and subsequently recognised as an appropriate code.

The receiver 42 may learn a number of codes such that it is responsive to signals from a corresponding number of remote units. To reset the receiver and wipe out all stored codes the magnet is held adjacent the reed switch and the PTT switch 34 of the remote module 33 pressed five times in quick succession. The receiver circuit 42 is programmed to recognise this as a 'clear all codes' signal. Alternatively the receiver could be programmed to recognise a signal lasting longer than a set duration.

It will be realised that apparatus in accordance with the invention may have any number of applications and the particular applications are outside the scope of the present specification. However for illustrative purposes a brief reference to one application of the invention is given below with reference to a rider of a police motorcycle.

The police rider would typically have a personal role radio mounted upon his person complete with a headset and UCI, the UCI either being mounted directly to the radio or perhaps strapped to his chest. The advantage of this is that whether on the bike or dismounted the police carries his complete radio system with him. However whilst riding the bike it is not desirable to let go of the controls and therefore the remote module 33 may be mounted at a convenient location on the handlebars of the bike. Thus when the rider wishes to reply to a communication he can simply push the button 34 and speak into the microphone. On leaving the bike he leaves the remote module 33 on the bike but can communicate by pressing PTT button 16 on the UCI 12.

The rider may ride a number of bikes and a particular bike may be ridden by a number of riders. Here the rider can program the receiver of his UCI with the code of all the bikes or vehicles he rides (cars he drives) so that a remote module mounted on any one of those vehicles will operate his particular radio. When he gets on to a bike he has not ridden before, he simply places his UCI 12 adjacent the remote module 33 of that bike such that the code of that remote module is then stored in the receiver of his UCI.

It would be possible for the remote module 33 to have a receiver and receive codes transmitted from the UCI, however this requires an extra receiver in the remote module 33 and transmitter in the UCI 12. Also it will be realised that a learning mode may be generated other than by magnet 35 for example a screwdriver could be placed in a small hole to operate a switch equivalent to the magnet 35 operating reed switch 43.

The above describes one way in which the present invention may be employed. However numerous other implementations and applications will occur to those skilled in the art which are within the scope of the appended claims.

The invention claimed is:

1. A radio system comprising:
a radio;
a press to talk (PTT) switch which, when operated, sets the radio to a transmit mode, wherein the PTT switch forms part of a switch unit which is supported on the radio by an interface arrangement allowing detachment of the switch unit from the radio; and
a cordless remote PTT module including a remote PTT switch, the cordless remote PTT module having a short range, relative to the radio, transmitter, wherein the switch unit includes a receiver for receiving signals from the cordless remote PTT module to remotely activate the function of the PTT switch of the switch unit,
wherein a signal transmitted from the cordless remote PTT module comprises a code and the receiver of the switch unit is responsive to the code.

2. A radio system as set forth in claim 1 further comprising a number of radios of different designs and a number of switch units, the interface arrangement allowing any one switch unit to be supported on any one radio.

3. A radio system as set forth in claim 1 further comprising an interface unit adapted to be connected to the radio by a flexible connection.

4. A radio system as set fort in claim 3 wherein the interface unit is arranged to be worn by the operator.

5. A radio system as set forth in claim 1 wherein the radio is a personal role radio arranged to be worn by the operator.

6. A radio system as set forth in claim 1 wherein the radio is configured to be mounted on a vehicle.

7. A radio system as set forth in claim 1 wherein the switch unit is connected to the radio by the interface arrangement and connected to a second radio by a wire or optical link.

8. A radio system as set forth in claim 7 wherein the wire or optical link is arranged to terminate in a manner such that the interface arrangement maintains the wire or optical link in contact with the switch unit.

9. A radio system as set forth in claim 7 wherein the radio is a personal role radio and the second radio is a network radio.

10. A radio system as set forth in claim 1 wherein the switch unit includes two PTT switches, a first PTT switch associated with a first radio and a second PTT switch associated with a separate radio network.

11. A radio system as set forth in claim 10 wherein the switch unit includes circuitry to prevent cross connection between different radio systems.

12. A radio system as set forth in claim 11 wherein the switch unit includes a connection for an operator headset.

13. A radio system as set forth in claim 10 wherein the first radio system is a personal role radio system and the second radio system is a combat network radio system.

14. A radio system as set forth in claim 1 further comprising a wired remote PTT module including a remote PTT switch, wherein the PTT module is small relative to the switch unit, the switch unit having a connection for the wire of the remote PTT switch so that the function of the PTT switch of the switch unit can be performed remotely.

15. A radio system as set forth in claim 1 wherein the short range transmitter is a radio transmitter.

16. A radio system as set forth in claim 1 wherein the short range transmitter is an infra-red transmitter.

17. A radio system as set forth in claim 1 wherein the cordless remote PTT module comprises two PTT switches associated with different radio networks.

18. A radio system as set forth in claim 1 wherein the receiver of the switch unit is responsive to a plurality of codes associated with different cordless remote PTT module.

19. A radio system as set forth in claim 18 wherein the receiver has a learn mode in which it can learn the codes of the cordless remote PTT module.

20. A radio system as set forth in claim 19 wherein the switch unit includes a magnetically operated switch and the cordless remote PTT module includes a magnet, the magnet and magnetically operated switch being arranged such that the magnetically operated switch is caused to adopt a learn mode position when the cordless remote PTT module and the magnet are held in an appropriate position relative to the magnetically operated switch, in which position activation of the PTT switch on the cordless remote PTT module causes the receiver to learn the code of the remote module.

21. A radio system as set forth in claim 20 wherein a depressing the PTT switch on the cordless remote PTT module a number of times or for a period in excess of a predetermined period causes one or more codes to be removed from the receiver so that the receiver is no longer responsive to those codes.

* * * * *